US012673887B2

(12) United States Patent (10) Patent No.: US 12,673,887 B2
Mehrvar et al. (45) Date of Patent: Jul. 7, 2026

(54) METHOD AND SYSTEM FOR PRE-TREATING HIGH STRENGTH WASTEWATER

(71) Applicants: Mehrab Mehrvar, Oakville (CA);
　　　　　　 Melody Blythe Johnson, Toronto (CA)

(72) Inventors: Mehrab Mehrvar, Oakville (CA);
　　　　　　 Melody Blythe Johnson, Toronto (CA)

(73) Assignees: Mehrab Mehrvar, Toronto (CA);
　　　　　　 Melody Blythe Johnson, Toronto (CA)

( * ) Notice: Subject to any disclaimer, the term of this patent is extended or adjusted under 35 U.S.C. 154(b) by 347 days.

(21) Appl. No.: 18/553,678

(22) PCT Filed: Apr. 4, 2022

(86) PCT No.: PCT/CA2022/050507
§ 371 (c)(1),
(2) Date: Oct. 2, 2023

(87) PCT Pub. No.: WO2022/204823
PCT Pub. Date: Oct. 6, 2022

(65) Prior Publication Data
US 2024/0182343 A1　　 Jun. 6, 2024

Related U.S. Application Data

(60) Provisional application No. 63/170,009, filed on Apr. 2, 2021.

(51) Int. Cl.
*C02F 9/00* 　　　　　 (2023.01)
*C02F 1/74* 　　　　　 (2023.01)
(Continued)

(52) U.S. Cl.
CPC .................. *C02F 9/00* (2013.01); *C02F 1/74* (2013.01); *C02F 3/1263* (2013.01);
(Continued)

(58) Field of Classification Search
None
See application file for complete search history.

(56) References Cited

U.S. PATENT DOCUMENTS

| | | |
|---|---|---|
| 2012/0027913 A1 | 2/2012 | Logan et al. |
| 2013/0213883 A1* | 8/2013 | Josse ........................ C02F 3/34 |
| | | 210/601 |
| 2021/0171375 A1* | 6/2021 | Houweling ............. C02F 3/102 |

FOREIGN PATENT DOCUMENTS

| | | |
|---|---|---|
| WO | 20010123309 A1 | 4/2001 |
| WO | 2008017487 A1 | 2/2008 |
| WO | 2019216906 A1 | 11/2019 |

OTHER PUBLICATIONS

International Search Report and Written Opinion mailed Jun. 29, 2022 in International Patent Application No. PCT/CA2022/050507 (10 pages).

* cited by examiner

*Primary Examiner* — Krishnan S Menon
(74) *Attorney, Agent, or Firm* — SMART & BIGGAR LP; Tonino Rosario Orsi

(57) ABSTRACT

At least one method and system for pre-treating wastewater is described. The method generally involves providing high strength wastewater and waste activated sludge from a wastewater treatment plant to a first reactor, forming a mixed liquor therefrom, aerating the mixed liquor, allowing the aerated mixed liquor to settle to form a clarified supernatant and a biomass, and providing the clarified supernatant to a liquid treatment train of the wastewater treatment plant. After allowing the mixed liquor to settle into the clarified supernatant and the biomass, the biomass may be provided to a second reactor, aerated, and provided to a solid treatment train of a wastewater treatment plant. The system generally includes a first reactor, a second reactor and (Continued)

optionally, a mechanical sludge thickening apparatus that are coupled to a high strength wastewater source and a wastewater treatment plant having a liquid treatment train and a solid treatment train.

19 Claims, 6 Drawing Sheets

(51) Int. Cl.
*C02F 3/12* (2023.01)
*C02F 11/123* (2019.01)
*C02F 11/126* (2019.01)
*C02F 11/127* (2019.01)
*C02F 103/00* (2006.01)
*C02F 103/32* (2006.01)

(52) U.S. Cl.
CPC ........... *C02F 3/1268* (2013.01); *C02F 11/123* (2013.01); *C02F 11/126* (2013.01); *C02F 11/127* (2013.01); *C02F 2103/005* (2013.01); *C02F 2103/325* (2013.01)

METHOD AND SYSTEM FOR PRE-TREATING HIGH STRENGTH WASTEWATER

CROSS-REFERENCE TO RELATED APPLICATION

This application is a national phase entry of PCT/CA2022/050507 filed Apr. 4, 2022, which claims the benefit of priority from U.S. Provisional Patent Application No. 63/170,009 filed Apr. 2, 2021, and the entire contents of which is hereby incorporated herein by reference in its entirety.

FIELD

Various embodiments are described herein that generally relate to the field of treating wastewater and more particularly to a method and system for the pre-treatment of high strength wastewater.

BACKGROUND

Municipal Wastewater Treatment Plants (WWTPs) are often tasked with treating loads of high strength wastewaters, such as septage, landfill leachate, and industrial wastewaters. Often, these high strength wastewaters are hauled to municipal WWTPs by truck, allowing operators to control their addition rates and locations to the overall treatment process.

However, municipal WWTPs can also receive hauled loads of high-strength (e.g., high organic parameter concentration) wastewaters that are periodic in nature. For example, such high-strength wastewaters may be from winery wastewater, which has volumes that peak in the fall, or from septage, which has volumes that peak in the late Spring to early Fall. When discharged to the municipal WWTPs' liquid or solids treatment trains, the high organic loading can stress the WWTP system, negatively impacting process performance and effluent quality. Because biologically based pre-treatment systems require consistent feed quality, their biomass cannot be adequately maintained during the low hauled waste volume periods. In addition, start-up of these systems requires weeks to months in order to establish a biomass inventory, reducing their ability to treat loads of high-strength wastewaters during this start-up period.

Furthermore, there are several factors that limit the feasibility of direct co-treatment of high strength wastewaters using existing municipal WWTP infrastructure. Even small volumes of high strength wastewater can exert a substantial organic loading on main WWTP treatment trains, reducing capacity that is available for domestic wastewater servicing. In addition, without adequate equalization infrastructure, the rapid off-loading of hauled waste truck contents into WWTP treatment trains can cause slug-loadings, which can negatively impact both aerobic and anaerobic treatment processes. Significant variations in influent loadings can also negatively impact process performance such as: (a) anaerobic digester souring due to organic overloading, (b) poor effluent quality due to insufficient aerobic reaction time and/or exceeding the available oxygenation system capacity, (c) high sludge generation rates impacting operating solids retention time (SRT) and nitrification performance, and (d) poor sludge settleability impairing secondary clarifier solids capture and biomass inventory capacity of the aerobic bioreactors.

SUMMARY OF VARIOUS EMBODIMENTS

In one broad aspect, at least one example embodiment described herein provides a method of pre-treating high strength wastewater, wherein the method comprises: providing high strength wastewater to a first reactor; providing waste activated sludge from a wastewater treatment plant to the first reactor; forming a mixed liquor from the high strength wastewater and the waste activated sludge; aerating the mixed liquor; allowing the mixed liquor to settle to form a clarified supernatant and a biomass; and providing the clarified supernatant to a liquid treatment train of the wastewater treatment plant.

In at least one embodiment, the method further comprises after allowing the mixed liquor to settle into the clarified supernatant and the biomass, providing the biomass to a second reactor; aerating the contents of the second reactor; and providing the contents of the second reactor to a solid treatment train of a wastewater treatment plant.

In at least one embodiment, the method further comprises performing a mechanical sludge thickening process on the biomass before providing the biomass to the second reactor.

In at least one embodiment, the mechanical sludge thickening process is performed using a rotary drum thickener.

In at least one embodiment, the mechanical sludge thickening process is performed using a thickening centrifuge.

In at least one embodiment, the mechanical sludge thickening process is performed using a gravity belt thickener.

In at least one embodiment, the mechanical sludge thickening process is performed using rotary presses.

In at least one embodiment, the method further comprises providing digester supernatant to the first reactor before aerating the mixed liquor.

In at least one embodiment, the digester supernatant is sourced from the wastewater treatment plant.

In at least one embodiment, the method further comprises providing secondary effluent, tertiary effluent, final effluent, potable water and/or freshwater to the first reactor before aerating the mixed liquor.

In at least one embodiment, the secondary effluent, the tertiary effluent or the final effluent is sourced from a wastewater treatment plant.

In at least one embodiment, the method comprises using a membrane bioreactor as the first reactor.

In at least one embodiment, the method further comprises filtering the high strength wastewater using a screen before providing the high strength wastewater to the first reactor.

In at least one embodiment, the method further comprises performing pH adjustment, defoaming and/or alkalinity addition on the high strength wastewater before providing the high strength wastewater to the first reactor.

In at least one embodiment, the method comprises obtaining the high strength wastewater from a food processing and/or beverage processing operation.

In at least one embodiment, the method comprises obtaining the high strength wastewater from a wine producing operation.

In at least one embodiment, the method comprises obtaining the high strength wastewater from an agricultural operation.

In at least one embodiment, the method comprises obtaining the high strength wastewater from septage.

In at least one embodiment, the high strength wastewater has a biochemical oxygen demand of at least about 1000 mg/L.

In another aspect, in accordance with the teachings herein, there is provided at least one embodiment of a system for use with a wastewater treatment plant for pre-treating high strength wastewater, wherein the system comprises: a first reactor that is operationally couplable to the wastewater treatment plant and is configured to receive the high strength wastewater from a high strength wastewater source, receive waste activated sludge from the wastewater treatment plant, form a mixed liquor from the high strength wastewater source and the waste activated sludge, aerate the mixed liquor, allow the mixed liquor to settle to form a clarified supernatant and a biomass, and provide the clarified supernatant to a liquid treatment train of the wastewater treatment plant.

In at least one embodiment, the system further comprises a second reactor that is coupled to the first reactor, the second reactor being configured to receive the biomass from the second reactor, aerate the biomass, allow the aerated biomass to settle, and after settling provide contents therein to a solid treatment train of the wastewater treatment plant.

In at least one embodiment, the system further comprises a mechanical sludge thickening apparatus that is coupled to the first reactor and the second reactor, and the mechanical sludge thickening apparatus is configured to receive the biomass from the first reactor, perform a thickening process to form a thickened biomass, and provide the thickened biomass to the second reactor.

In at least one embodiment, the mechanical sludge thickening apparatus is a rotary drum thickener.

In at least one embodiment, the mechanical sludge thickening apparatus is a thickening centrifuge.

In at least one embodiment, the mechanical sludge thickening apparatus is a gravity belt thickener.

In at least one embodiment, the mechanical sludge thickening apparatus includes rotary presses.

In at least one embodiment, the first reactor is further configured to receive a digester supernatant from the wastewater treatment plant, before aerating the mixed liquor.

In at least one embodiment, the first reactor is further configured to receive a secondary effluent, a tertiary effluent, a final effluent, potable water and/or freshwater, before aerating the mixed liquor, where the secondary effluent, the tertiary effluent, or the final effluent are received from the wastewater treatment plant.

In another aspect, in accordance with the teachings herein, there is provided at least one embodiment of a method of pre-treating high strength wastewater, wherein the method comprises: providing high strength wastewater to a first reactor; providing waste activated sludge from a wastewater treatment plant to the first reactor; forming a mixed liquor from the high strength wastewater and the waste activated sludge; aerating the mixed liquor; performing a mechanical sludge thickening process on the aerated mixed liquor to separate the mixed liquor into a clarified supernatant and biomass; and providing the clarified supernatant to a liquid treatment train of the wastewater treatment plant.

In at least one embodiment, the method further comprises: after separating the mixed liquor into the clarified supernatant and the biomass, providing the biomass to a second reactor; aerating the contents of the second reactor; and providing the contents of the second reactor to a solid treatment train of a wastewater treatment plant.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

Figure 1:
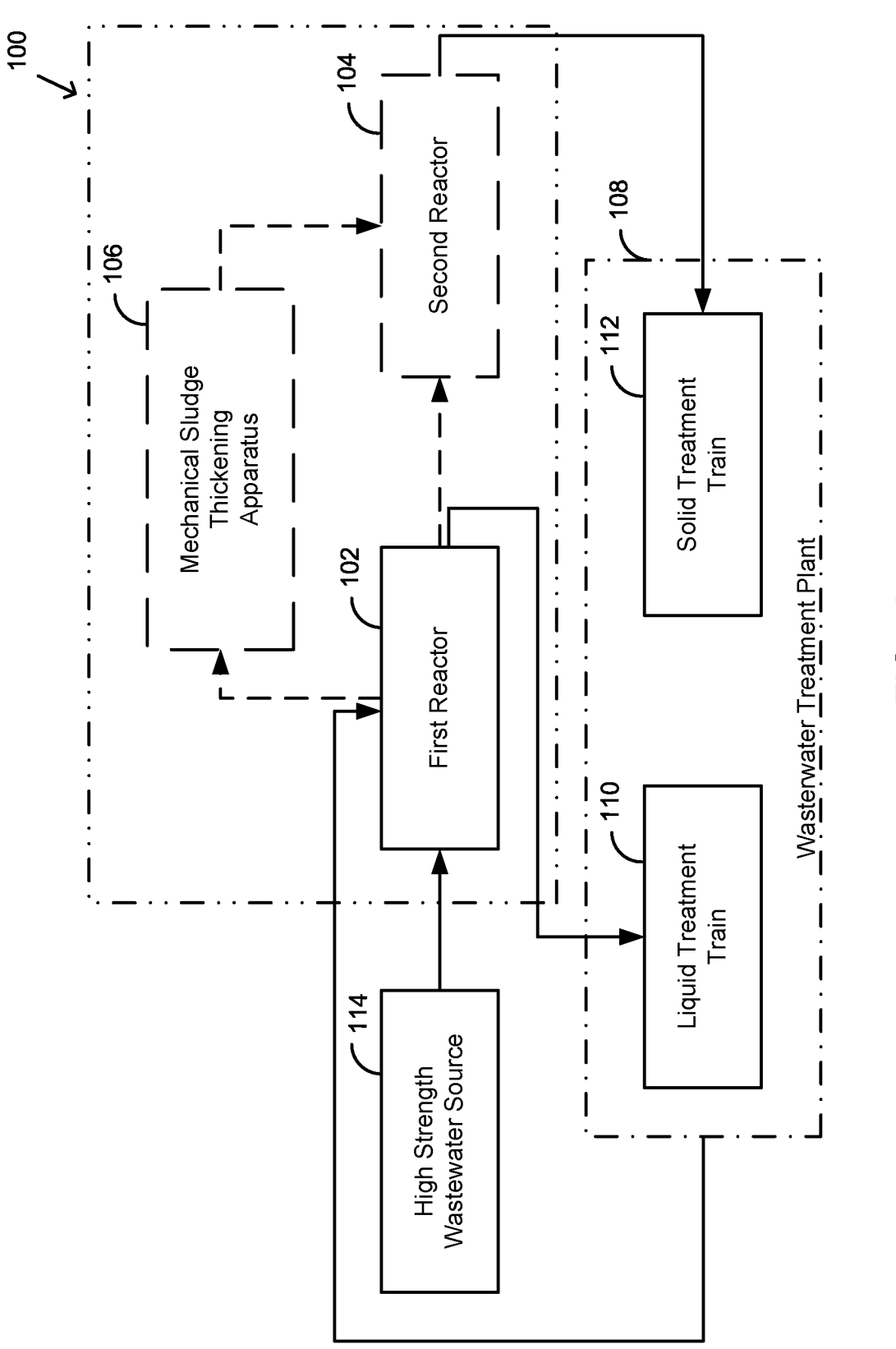
FIG. 1 is a block diagram showing an example embodiment of a system for pre-treating high strength wastewater.

Further aspects and features of the example embodiments described herein will appear from the following description taken together with the accompanying drawings.

DETAILED DESCRIPTION OF THE EMBODIMENTS

Various embodiments in accordance with the teachings herein will be described below to provide an example of at least one embodiment of the claimed subject matter. No embodiment described herein limits any claimed subject matter. The claimed subject matter is not limited to devices, systems or methods having all of the features of any one of the devices, systems or methods described below, or to features common to some or all of the devices and/or methods described herein. It is possible that there may be a device or method described herein that is not an embodiment of any claimed subject matter. Any subject matter that is described herein that is not claimed in this document may be the subject matter of another protective instrument, for example, a continuing patent application, and the applicants, inventors or owners do not intend to abandon, disclaim or dedicate to the public any such subject matter by its disclosure in this document.

It will be appreciated that for simplicity and clarity of illustration, where considered appropriate, reference numerals may be repeated in the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling can have a mechanical or fluidic connotation. For example, as used herein, the terms coupled or coupling can indicate that two elements or devices can be directly connected to one another or connected to one another through one or more intermediate elements, devices or mechanical elements, depending on the particular context. Fluidic coupling is meant to cover the propagation of fluid or sludge containing material between different vessels, tanks or apparatuses.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term, such as by 1%, 2%, 5% or 10%, for example, if this deviation does not negate the meaning of the term it modifies.

Furthermore, the recitation of numerical ranges by endpoints herein include all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

In accordance with the teachings herein, in one aspect, at least one example embodiment of a pre-treatment system and method is provided herein for pretreating high strength hauled wastewaters, which may be obtained from various sources such as, but not limited to, the food industry for example, to reduce loadings to downstream processing systems such as municipal wastewater treatment plant (WWTP) treatment trains. Pre-treatment methods may be referred to as a Waste Activated Sludge-High Rate (WASHR) process.

In another aspect, in at least one example embodiment, the pre-treatment system and method use an already existing biomass from one or more waste streams of the municipal WWTP's process. For example, the waste activated sludge (WAS) stream, common to all suspended growth activated sludge based municipal WWTPs, may be used as the biomass for the pre-treatment system. Accordingly, such system and methods described herein may be capable of rapid start-up and production of effluent so that they are able to react rapidly to changing influent loading conditions. Consequently, such pre-treatment systems and methods described herein may be brought online and offline as needed. This is advantageous since otherwise biological pre-treatment and/or side-stream treatment systems require the development and maintenance of a separate biomass inventory which requires a long start-up period for the growth and acclimation of the biomass, and steady sources of influent organic loadings to keep the biomass active.

In another aspect, in accordance with the teachings herein, when integrated into an existing municipal WWTP, at least one example embodiment of the WASHR pre-treatment system and method uses a batch reaction approach in which the WAS and other tank contents are directed to either the municipal WWTP's solid or liquid treatment trains at the end of each treatment cycle. This approach overcomes the disadvantages associated with biologically-based pre-treatment systems since the WASHR system can be brought online as needed (there may be no start-up period), and the WASHR tankage may be completely emptied at the end of each treatment cycle so there is no maintenance of a dedicated biomass. In addition, the WASHR system may reduce loadings to the liquid and solids treatment trains of the municipal WWTP, reducing the potential negative impacts on digestion performance and effluent quality.

When pre-treatment systems according to the teachings herein are integrated or retrofitted to an existing WWTP, the systems are not complicated to operate, and may result in a reduction or elimination for the need for additional chemicals during processing. Some testing has shown that at least one example embodiment of the pre-treatment system may be implemented so that it is economically viable and environmentally sustainable. In such embodiments, the pre-treatment methods can be used to improve co-treatment of high strength wastewaters.

Referring now to FIG. 1, pictured therein is a block diagram depicting an example embodiment of a system 100 for pre-treating high strength wastewater. The description in reference to FIGS. 2 and 3 in reference to methods 200 and method 300 may apply to system 100. There may be various embodiments of the system 100 based on various optional structural and/or functional features described herein. At least one example embodiment of the system 100 may include all of these structural and/or functional features.

The system 100 comprises a first reactor 102, and an optional second reactor 104. In an alternative embodiment, the system 100 may additionally comprise mechanical sludge thickening apparatus 106. The system 100 is connectable to a wastewater treatment plant 108 having a liquid treatment train 110, and a solid treatment train 112. The system 100 receives high strength wastewater from a high strength wastewater source 114.

The first reactor 102 is configured to receive high strength wastewater from the high strength wastewater source 114. High strength wastewater source 114 may be a food processing operation and/or beverage processing, a wine producing operation, an agricultural operation, disposal of septage or any other source producing high strength wastewater which is sufficiently contaminated such that treatment at a typical WWTP may adversely affect the performance of the WWTP. For example, the high strength wastewater may result in high organic loadings on the WWTP's liquid treatment train. High loadings may have adverse impacts on the WWTP such as poor effluent quality and anaerobic digester souring. It is advantageous to pre-treat wastewater to reduce high organic loadings on the WWTP.

In some cases, the high strength wastewater may be wastewater characterized by a high biochemical oxygen demand (BOD). In such cases, a high BOD may be defined as being at least 1000 mg/L and may even be 2000 mg/L in some cases or considerably higher than 2000 mg/L in some cases.

In some cases, the high strength wastewater may by hauled from its source by tanker truck to be provided to the first reactor 102. In other cases, the high strength wastewater may be provided to the first reactor 102 through a sewer system that keeps the high-strength wastewater separate from the other domestic wastewaters, for example via a dedicated force main.

In at least one example embodiment of the system 100, the high strength wastewater may be processed before being received by the first reactor 102. For example, the high strength wastewater may be passed through a screen to remove large solids and particulates therefrom. The mesh size of the screen may vary depending on the high strength wastewater source and the composition of the high strength wastewater. Alternatively, or in addition thereto, in at least one example embodiment, the high strength wastewater may be processed to adjust its pH. Equalization and/or short-term storage of the high-strength wastewater may be used to control the rate of addition to the first reactor 102.

The first reactor 102 may be any apparatus known in the art that is suitable for conducting a contact stage of a batch configuration contact stabilization process. Accordingly, the first reactor 102 may be equipped with an aeration system for aerating the contents of the reactor. The aeration system may comprise a diffused aeration system, producing coarse, medium or fine bubbles, a mechanical aerator, a pure oxygen system or any other system known in the art for oxygenating the contents of a reactor. The aeration system may be integrated into the first reactor 102, or external aeration equipment may be coupled to the first reactor 102 to provide oxygen or another suitable gas when needed. The first reactor 102 may also be referred to as a contact tank.

The first reactor 102 may be installed above or below grade and have a volume that is large enough to handle the amount of high strength wastewater loadings that are expected over a particular period of time. Furthermore, in at least one example embodiment, the first reactor 102 may be comprised of cast-in-place concrete. In at least one other example embodiment, the first reactor 102 may be comprised of another material which is resistant to the components of the wastewater and is therefore suitable for the containing wastewater.

WWTP 108 may be any typical WWTP, such as a municipal wastewater treatment facility. The WWTP 108 comprises a liquid treatment train 110, and a solid treatment train 112. The liquid treatment train 110 is generally configured to receive contaminated wastewater and process it to reduce the amount of contaminants contained within the wastewater. The solid treatment train 112 is generally configured to receive waste solids and/or waste biomass and process it to reduce the amount of contamination contained within the solid waste.

In at least one example embodiment of the system 100, the first reactor 102 may be operationally coupled to the WWTP 108. For example, the first reactor 102 may be coupled to the WWTP 108 to receive waste activated sludge therefrom.

In at least one example embodiment of the system 100, the first reactor 102 may be additionally operationally coupled to the WWTP 108 to receive clarified supernatant therefrom.

In at least one example embodiment of the system 100, the first reactor 102 may be additionally operationally coupled to the WWTP 108 to receive secondary effluent therefrom.

The combination of waste activated sludge, high strength wastewater, an optional secondary effluent, and an optional clarified supernatant, may be referred to as a mixed liquor. The first reactor 102 is generally configured to aerate the mixed liquor. During aeration, the contaminants initially present within the high strength wastewater are sorbed into a biological floc of the mixed liquor.

The first reactor 102 is operated to allow the aerated mixed liquor to settle. The mixed liquor may settle into two vertically distinct fractions: a lower settled biomass fraction, and an upper clarified supernatant.

The first reactor 102 may be operationally coupled to provide the clarified supernatant fraction to the liquid treatment train 110 of the WWTP 108 for further treatment. The clarified supernatant fraction provided to the liquid treatment train 110 has a reduced level of contamination, such that it may be readily processed by the liquid treatment train 110 without causing excess organic loadings on the liquid treatment train 110. The contamination level of the clarified supernatant fraction may be quantified by BOD and/or Chemical Oxygen Demand (COD).

In at least one example embodiment of the system 100, the second reactor 104 is coupled to first reactor 102. After settling of the aerated mixed liquor in the first reactor 102, the settled biomass is received by second reactor 104.

The second reactor 104 may be any vessel known in the art suitable for the aeration of settled biomass for the oxidation of organic contaminants sorbed into the biological floc. The second reactor 104 may be further equipped with an aeration system. The aeration system may comprise a diffused aeration system, producing coarse, medium or fine bubbles, a mechanical aerator, a pure oxygen system or any other system known in the art for oxygenating the contents of a reactor. The aeration system may be integrated into the second reactor 104 or it may be external aeration equipment that is coupled to the second reactor 104 to provide oxygen or another suitable gas when needed. The second reactor 104 may also be referred to as a stabilization tank.

The second reactor 104 is configured to aerate the settled biomass. Aeration of the biomass promotes aerobic biological activity, wherein the microbes within the biomass decompose the sorbed organic contaminants. The second reactor 104 may be operated so that the settled biomass is continuously aerated for a predetermined duration of time. For example, the settled biomass may be aerated for 12 hours, 18 hours or another suitable period of time. Typically, the aeration time in the second reactor 104 is longer than the aeration time in the first reactor 102.

The second reactor 104 may be coupled to the solid treatment train 112 of the WWTP 108. In such cases, after aeration, the settled biomass is provided to the solid treatment train 112 for further treatment. The solid treatment train 112 may subject the aerated biomass to aerobic or anaerobic treatment or some other treatment process to further remove contaminants from the biomass.

In at least one example embodiment of the system 100, the system 100 may further comprise a mechanical sludge thickening apparatus 106. In such embodiments, the mechanical sludge thickening apparatus 106 may be coupled to the first reactor 102 and the second reactor 104. The mechanical sludge thickening apparatus 106 may be a rotary drum thickener, a thickening centrifuge, a gravity belt thickener or rotary presses.

Instead of providing settled biomass directly from the first reactor 102 to the second reactor 104, the settled biomass is first provided to the mechanical sludge thickening apparatus 106 from the first reactor 102. The mechanical sludge thickening apparatus 106 may be operated to perform an operation on the provided biomass to reduce the liquid content of the biomass, thereby increasing its solids concentration, and create thickened sludge. The use of the mechanical sludge thickening apparatus 106 may be especially advantageous in situations where the high strength wastewater or waste activated sludge is of a character that results in a mixed liquor that is resistant to settling under quiescent conditions. This impact to settleability may be due to the type of contaminants and the characteristics of the solids in the wastewater, or the quality of the waste activated sludge. After the thickening process performed by the mechanical sludge thickening apparatus 106 is complete, the thickened sludge may be provided to the second reactor 104 for further processing, as described above.

In at least one example embodiment of the system 100 equipped with the mechanical sludge thickening apparatus 106, the aerated mixed liquor may not require a settling period, or the duration of settling under quiescent conditions may be reduced.

In at least one example embodiment, the system 100 may be further equipped with a control system (not shown). The control system may be coupled to the first reactor 102, the second reactor 104, the mechanical sludge thickening apparatus 106 and the WWTP 108. The control system may be a closed loop control system, in which feedback that is used to adjust control signals provided by the control system is based on data measured by one or more sensors coupled to one of the components of the system 100.

The control system 100 generally includes at least one processor, a memory store, at least one sensor and electronic valves. The at least one processor is operationally coupled to the memory store, the at least one sensor and the electronic valves. The memory store includes software programs with software instructions, which when executed by the at least one processor cause the control system to perform various aspects of the methods 200 and 300 described below. For example, the control system may operate electronic valves connected between certain components of the system 100 to open or close these valves to control the flow of material between these components and time timing of these flows.

For example, the control system may adjust the duration of one or more steps of the treatment process based on feedback obtained from at least one sensor that is coupled to the first reactor 102, the second reactor 104 and/or the mechanical sludge thickening apparatus 106 for monitoring at least one quantity in these components. For example, the at least one sensor may be implemented to measure at least one quantity such as, but not limited to, volume, suspended solids concentration, turbidity, pH, dissolved oxygen (DO), temperature, solids blanket level and chemical composition for the contents of the first reactor 102, the second reactor 104 and/or the mechanical sludge thickening apparatus 106. The actual number and type of sensors that are used will depend on the control system. For example, sensors may be used to measure DO and pH and make adjustments based on those two values, or alternatively a sensor can be used to measure sludge blanket level and make adjustments accordingly.

Alternatively, the control system may be configured to set the duration of one or more steps of the treatment process based on values inputted by an operator. For example, in at least one embodiment, the system 100 may be operated in manual mode, in which an operator would monitor the operation of the system 100 throughout the treatment cycle to start and stop various operations such as, but not limited to, pumping and aeration. This may be in addition to some automatic controls for components such as, but not limited to, high/low level alarms to control pumping systems so as to not overflow tanks, for example.

Figures 2, 3:
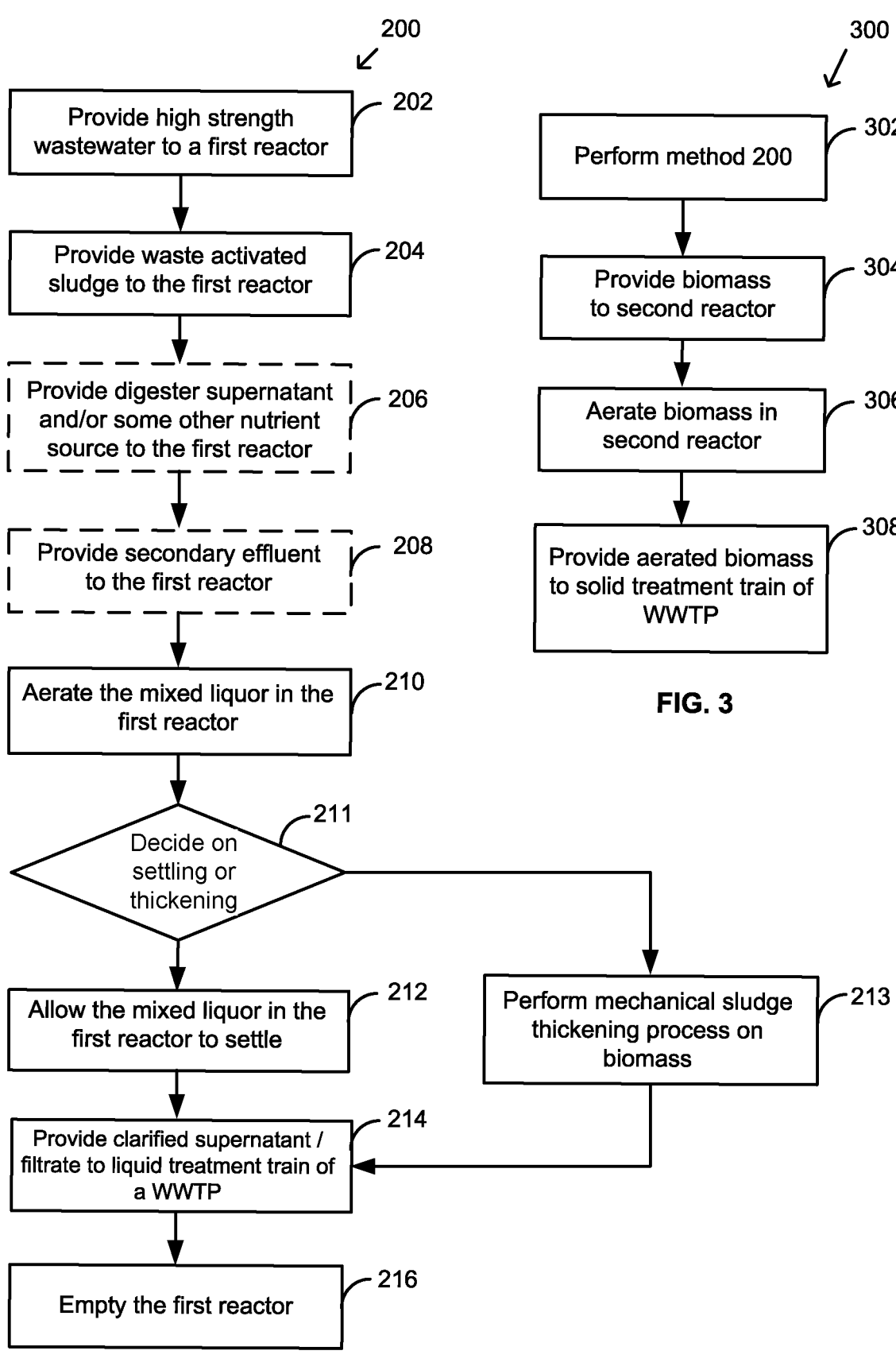
FIG. 2 is a flow chart showing an example embodiment of a method of pre-treating high strength wastewater.
FIG. 3 is a flow chart showing another example embodiment of a method of pre-treating high strength wastewater.

Referring now to FIG. 2, pictured therein is an example embodiment of a method 200 for pre-treating high strength wastewater. Method 200 comprises part of the WASHR process. Actions depicted in stippled lines are optional. There may be various embodiments of the method 200 based on various optional functional features described herein. At least one example embodiment of the method 200 may include all of these functional features. For ease of illustration, method 200 will be described as being performed using the components of the system 100. However, it should be understood that method 200 can be performed using other suitable systems.

The method 200 is a modified contact stabilization activated sludge process. Instead of seeding and maintaining a dedicated biomass source for method 200, each treatment cycle utilizes newly created WAS, which may be from a WWTP's liquid treatment train, as the biomass source. This allows the system to be brought online when and as required, with no startup or acclimation period needed. The WAS may be removed at the end of each treatment cycle.

Contact stabilization processes typically operate in a continuous mode, while method 200 operates in a batch mode. Batch-wise operation allows method 200 to accommodate the periodic loads of high strength wastewater that tend to be delivered to waste-water treatment plants. Batch-wise operation additionally allows operational flexibility to vary the duration of aerobic biological treatment.

Method 200 may be conducted at or near a typical WWTP, as a pre-treatment method for high strength wastewaters prior to treatment in the liquid treatment train of a WWTP.

Method 200 begins at 202, wherein high strength wastewater is provided to the first reactor 102. The high strength wastewater may be wastewater sourced from food and/or beverage processing operations, wine producing operations, agricultural operations, septage, portable toilet waste, or any other sources producing wastewater which is sufficiently contaminated such that treatment at a typical WWTP may result in high organic loadings on the WWTP. High loadings may have adverse impacts on the WWTP such as poor effluent quality and anaerobic digester souring. It is advantageous to pre-treat wastewater to reduce high organic loadings on the treatment plant. The high strength wastewater may be wastewater characterized by a high BOD as previously described.

In at least one alternative example embodiment of method 200, high strength wastewater may be processed before being provided to the first reactor at 102. For instance, in at least one alternative example embodiment of the method 200, high strength wastewater may be passed through a screen, allowed to settle or subjected to other particle and grit removal processes to remove large solids and particulates from the wastewater as described previously for system 100. In addition, or in at least one alternative example embodiment, high strength wastewater may be chemically pre-treated, for instance, by adjusting pH, or by the addition of a defoaming agent or other chemical agents.

Referring now to 204, WAS is provided to the first reactor 102. The waste activated sludge may comprise aerobic and/or anaerobic microbes that sorb contaminants into the floc and may decompose contaminants present in the high strength wastewater. The WAS may be sourced from the WWTP. For example, the method 200 may be conducted at or near a WWTP which can provide the WAS. Once WAS is provided to the first reactor 102, the WAS sludge is mixed with the high strength wastewater to create a mixed liquor.

In at least one example embodiment, the method 100 may only be performed intermittently such as when, for example, high strength wastewater is provided to wastewater treatment facilities. This may be done at irregular intervals by tanker truck. Some industrial food operations, such as large-scale winemaking occur seasonally, and thus, produce wastewater more frequently during seasonal intervals. Furthermore, deliveries of high strength wastewater may vary significantly in volume between deliveries. There may also be long stretches of time wherein no deliveries of high strength wastewater are received.

Accordingly, in the operation of method 200, it may be advantageous to source WAS from a continuously active wastewater treatment facility instead of maintaining a dedicated biomass for a pre-treatment process. Wastewater treatment facilities may be continuously wasting activated sludge. Using WAS on an as needed basis, sourcing it from the waste stream of an affiliated or nearby WWTP instead of maintaining a biomass that is not continuously used, may provide economic and operational advantages. For example, the WAS can be obtained whenever needed, in large quantities, at little to no cost.

In at least one alternative example embodiment of method 200, a digester supernatant may be provided to the first reactor 102 at 206. In some situations, the high strength wastewater may lack sufficient nutrients to support aerobic biological activity. These nutrients may include nitrogen (N) and phosphorus (P). This can be measured but typically, for a given high-strength wastewater type, one can determine what the typical nutrient ratios are and what is missing/needed (this also depends on the specific wastewater being treated). Anaerobic digester supernatant may generally be characterized as being rich in nutrients due to high ammonia and phosphorus content. However, aerobic digester supernatant may sometimes be lacking in N or P or both (depending on the technology used and site-specific conditions). Accordingly, the addition of anaerobic digester supernatant to the first reactor 102 may provide sufficient nutrient content to sustain biological activity. As the basis of the treatment of high strength wastewater in method 200 is biological activity. The addition of the anaerobic digester supernatant at 206 may promote more complete degradation of contaminants in the high strength wastewater.

Digester supernatant may be sourced from a WWTP. For example, digester supernatant may be sourced from the anaerobic digestion process of a WWTP. Digester supernatant, rich in phosphorus and ammonia may be acquired from a WWTP plant at little to no cost.

In at least one example embodiment, when the digester supernatant from the WWTP is an insufficient or inappropriate nutrient source, or is otherwise unavailable, nutrient supplementing chemicals may alternatively be added to the mixed liquor. Nutrient supplementing chemicals may include phosphoric acid for providing P and urea for providing N. As with the high-strength wastewater, an operator has some knowledge of the typical concentrations of N, P and other parameters in the digester supernatant through routine sampling and/or monitoring. These parameters are usually fairly stable for a well operating WWTP.

In at least one example embodiment, when the digester supernatant from the WWTP is unavailable, or is an insufficient or inappropriate nutrient source, filtrate and, or centrate generated during the thickening and/or dewatering of sludge in the WWTP's solids treatment train may be alternatively used as a nutrient source.

In at least one alternative embodiment, method 200 may further comprise step 208 where secondary effluent may be provided to the first reactor 102. The secondary effluent may be used to dilute the mixed liquor to a more optimal level. Dilution may promote efficient sorption of contaminants into the biological floc of the mixed liquor as well as promote efficient biological activity. Additionally, dilution may promote efficient aeration at step 210. Since an aeration apparatus has a maximum aeration capacity, dilution may reduce the volumetric oxygen demand of the mixed liquor to a level that is better aligned with (i.e. below) the aeration capacity of the aeration apparatus. As an example, in the experimental trials (which are described in more detail below), the mixed liquor in the first reactor 102 may be run at about 1,500 mg/L at the start of the treatment process. The first reactor 102 may be run above or below this depending on the characteristics of the WAS and/or high strength wastewater. The amount of secondary effluent needed (or alternatively tertiary effluent, final effluent, potable water or any other freshwater source) may depend on the concentration and volume of the WAS that is being added, the amount of wastewater that is being added, and the final desired mixed liquor concentration.

At 210, the mixed liquor is aerated in the first reactor 102, which may be referred to as a reaction step. During aeration, the organic and other contaminants present in the high strength wastewater are sorbed into the biological floc that is present in the mixed liquor.

In at least one example embodiment, the mixed liquor may be continuously aerated for a set period of time. The duration of aeration may vary depending on the level and characteristics of contamination of the mixed liquor. For instance, some wastewater contaminants will quickly sorb to the floc; while others will be slow to sorb to the floc. For example, mixed liquors that are more heavily contaminated may be aerated for a longer length of time than mixed liquors that are less heavily contaminated. The contamination level may be approximately quantified by using various measures including, but not limited to, BOD or COD concentration. For example, a good way to define the length of time that is needed for aeration is when the supernatant from the first reactor 102 has a COD or BOD concentration less than the target value and/or some COD or BOD removal rate has been achieved. This generally depends on the characteristics of the biomass and the high strength wastewater being treated. For example, in tests with winery wastewater, this time period was found to be about 3 to 6 hours. Real-time monitoring may be difficult as the BOD measurement takes 5 days, while the COD measurement takes hours. However, the results of trial data, based on the wastewater to be treated, may be used to select the most appropriate reaction time.

In at least one example embodiment, the contents of the first reactor 102 may be aerated periodically, at predetermined time intervals. This may be done later in the reaction time in the first reactor 102, when oxygen demands decrease. For example, in embodiments in which the system 100 further comprises a controller or a control system, the contents of the first reactor 102 may be aerated as directed by the control system as previously described. For example, data measured by one or more sensors may be used by the control system to determine whether the contents of the first reactor 102 have been sufficiently aerated to achieve a desired level of treatment. For example, the aeration periods may be determined based on DO concentrations in the reactor (e.g., when the DO concentrations start to get high, one may stop aeration until the DO concentrations drops below some value). Periodic or alternating aeration may provide the advantage of enhanced removal of nitrite and/or nitrate from the mixed liquor.

Aeration may be conducted with any aeration equipment known in the art. For example, the first reactor 102 may have integrated aeration equipment or it may be coupled to external aeration equipment. Contents of the first reactor 102 may be aerated with compressed ambient air, pure oxygen, or any other gas that may provide oxygen to the contents of the first reactor 102.

At 211, the method 200 involves determining whether to allow for settling or to perform thickening. This decision may be based on the settling characteristics of the biomass, e.g., for a poor settling biomass it may be decided to perform thickening. Alternatively, thickening may be performed regardless of the settling characteristics, and simply out of preference.

At 212, the aeration of the mixed liquor in the first reactor 102 ceases and the mixed liquor is allowed to settle under quiescent conditions. During the reaction/aeration cycle of 210, the contaminants are sorbed into the biological floc. The contents of the first reactor 102 may be allowed to settle at 212 for a length of time sufficient to allow the contents to settle into two relatively distinct fractions. The location of the interface between the two fractions may be detected using a sludge blanket monitor. These fractions are the clarified supernatant, and the biomass. The biomass may settle along the lower portion of the first reactor 102, while the clarified supernatant may settle above the biomass fraction. The biomass fraction may largely comprise the biological floc, which has sorbed a significant portion of the contaminants initially present within the mixed liquor. The clarified supernatant may largely comprise the liquid fraction of the mixed liquor, and has a reduced contamination level.

The length of time for the settling at 212 may vary depending on the size of the first reactor 102, the character of the solid fraction of the high strength wastewater, the initial BOD of the high strength wastewater, the microbial nature of the WAS, the temperature of the contents of the first reactor 102, and/or other factors. Allowing the contents of the first reactor 102 to settle for longer periods of time may result in a greater separation between the two fractions. For example, the contents of the first reactor 102 may be allowed to settle for 30 minutes, 60 minutes or another time period.

At 214, the clarified supernatant fraction/filtrate may be provided to a liquid treatment train 110 of the WWTP 108. The clarified supernatant is characterized as having a lower BOD than that of the high strength wastewater initially provided at 202. The clarified supernatant may therefore be treated by a traditional liquid treatment train 110 of the WWTP 108, with a much lower risk of resulting in excessively high loadings on the liquid treatment train.

At 216, the remaining contents are removed and the first reactor 102 is emptied. If the two fractions are allowed to settle sufficiently at 212, the remaining contents of the first reactor at 216 should largely be the biomass fraction. After the completion of 216, the first reactor 102 is empty, and prepared for a subsequent reaction cycle.

If the decision at 211 was to perform thickening, a mechanical sludge thickening process may be performed on the biomass at step 213. For example, the mechanical sludge thickening process may comprise the use of a rotary drum thickener, a thickening centrifuge or a gravity belt thickener. At 212 of method 200, the mixed liquor is allowed to settle under quiescent conditions. While settling will allow the mixed liquor to separate into two fractions, it is likely that some clarified supernatant will remain within the biomass fraction. Alternatively, step 213 may be performed after allowing settling (not shown). In both cases, the filtrate (low in solids) may be sent to the liquid treatment train 110 of the WWTP 108 and the retentate (thickened biomass) may be sent to the stabilization stage (e.g., method 300). The additional mechanical sludge thickening process may be used to separate clarified supernatant from biomass to a greater degree. The performance of step 213 may be especially advantageous if the high strength wastewater provided at 202 is of a character that negatively impacted settleability. This may be assessed at an earlier time such as from trial testing data, previous experience with various high strength wastewater, and issues with settleability of the biomass in the WWTP's aerated bioreactor, which may be determinative of whether step 213 is to be performed. If step 213 is an available part of the process, then in an alternative embodiment, the decision to use or not use step 213 may be determined after step 212 is performed and poor settling is observed (i.e., there is a high sludge blanket and only a small layer of clarified supernatant is present). After step 213, steps 214 and 216 may be performed.

Accordingly, in at least one alternative embodiment, 213 may be performed instead of 212.

Alternatively, in at least one example embodiment of method 200, when the first reactor 102 comprises a membrane bioreactor, step 213 and the settling process at step 212 may not be necessary, as the use of a membrane bioreactor may provide simultaneous solids separation and sludge thickening within the first reactor 102 in the event that the high strength wastewater provided at 202 is of a character that negatively impacts settleability.

It should be noted that in alternative embodiments of method 200, none, one, two or all of acts 206, 208 and 213 may be performed.

Referring now to FIG. 3, pictured therein is an example embodiment of a method 300 of treating wastewater. Method 300 comprises performing steps 202 to 204, 210, and 214 to 216 of method 200 at 302. In alternative embodiments of method 300, any one, two or all of steps 206, 208, 212 and 213 may also be performed. For example, step 212 may not always be performed if step 213 is performed. Method 300 may be referred to as the stabilization stage. Method 300 provides aerobic oxidation of the organic material captured by the biological floc during method 200. For ease of illustration, method 300 will be described as being performed using the components of the system 100. However, it should be understood that method 300 can be performed using other suitable systems.

At 304, the biomass produced in method 200 is provided to a second reactor such as reactor 104. Accordingly, the second reactor 104 may be any vessel that is suitable for aerating the settled or thickened biomass. Preferably, the second reactor 104 is equipped with an integrated or external aeration apparatus. Contents of the second reactor 104 may be aerated with compressed ambient air, pure oxygen, or any other gas that may provide oxygen to the contents of the second reactor 104. Similar aeration equipment may be used for both reactors 102 and 104. For example, blowers may be connected to diffusers in both reactors 102 and 104.

At 306, the settled biomass is continuously aerated in the second reactor 104. The aeration allows the biomass to be used for oxidizing organic material sorbed during 210 of method 200. For example, the settled biomass may be continuously aerated for a set period of time. Alternatively, the duration of aeration may be varied depending on the level of initial contamination of the high strength wastewater provided at 202. For example, wastewaters that are more heavily contaminated may be aerated for a longer length of time than wastewaters that are less heavily contaminated. In at least one example embodiment, the contamination level may be approximately quantified by BOD and the aeration period may be set based on the quantified BOD.

In at least one other example embodiment, the stabilization level may be approximately quantified by volatile solids removal rate and the aeration period may be set based on the quantified volatile solids concentration of the biomass and/ or volatile solids removal rate.

Alternatively, in at least one example embodiment, the biomass may be aerated for 8 hours, 16 hours or another time period at 306. The aeration process at step 306 may be conducted for a longer time duration than the aeration process at step 210.

Alternatively, in at least one example embodiment, the biomass may be aerated periodically, at predetermined time intervals.

Alternatively, in at least one example embodiment, the biomass may be aerated as directed by the control system described for system 100 using one or more sensors within the second reactor 104. These one or more sensors may measure dissolved oxygen, pH, temperature, suspended solids or any other quantity of interest. The output of the one or more sensors may be used by the control system to determine whether the contents of the second reactor 104 have been sufficiently aerated for certain purposes such as, but not limited to, achieving a desired level of treatment.

At 308, the aerated biomass may be provided to a solid treatment train 112 of the WWTP 108.

After the completion of 308, the second reactor 104 is empty, and idle. Subsequently, the second reactor 104 may be provided with another batch of settled biomass to complete another cycle of the WASHR treatment process.

Figure 4:
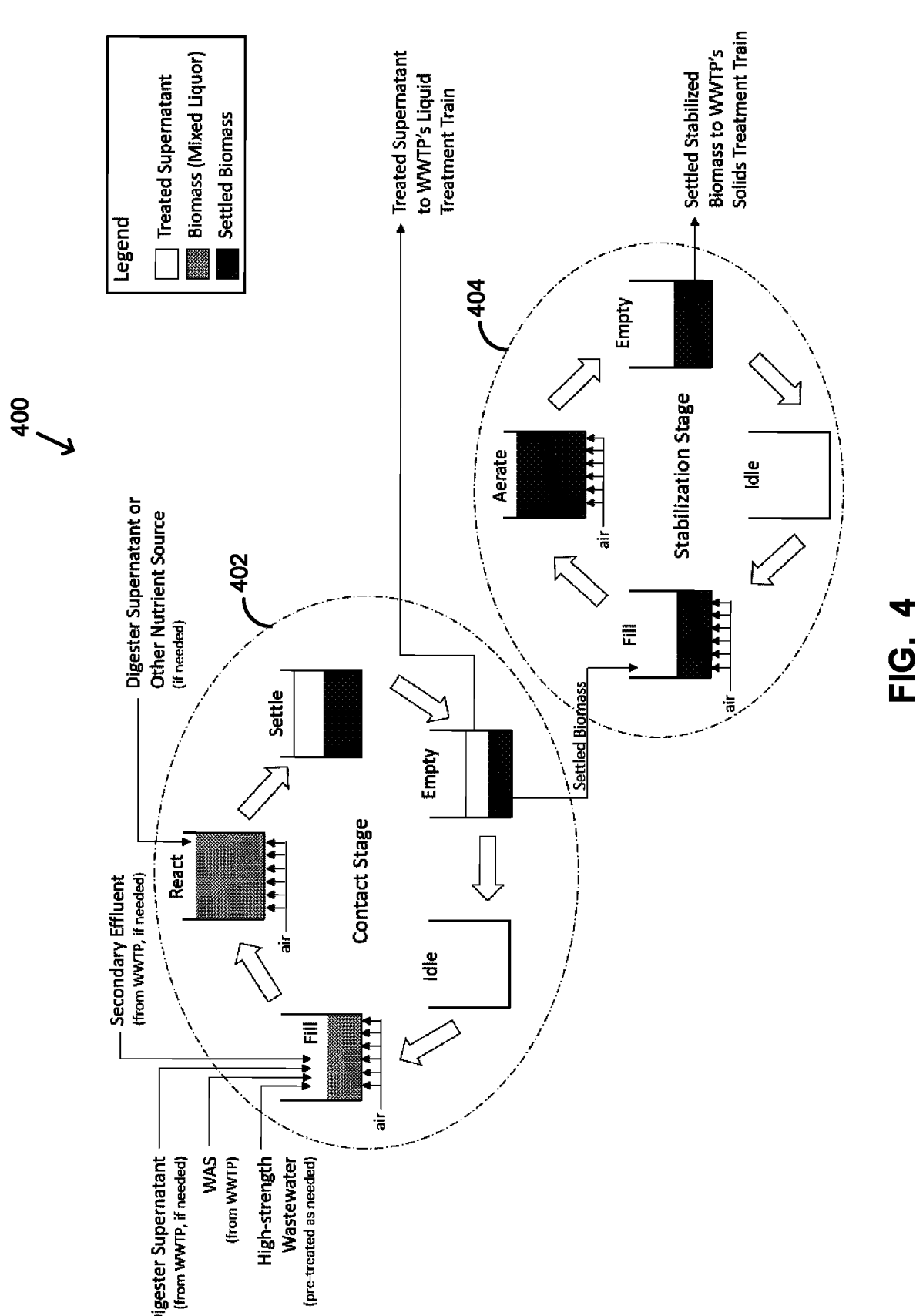
FIG. 4 is a process flow diagram corresponding to the methods shown in FIGS. 2 and 3.

Referring now to FIG. 4, shown therein is a process flow diagram for an example embodiment of a modified contact and stabilization method 400 that is generally employed by the methods 200 and 300 shown in FIGS. 2 and 3 in accordance with the teachings herein. The modified contact and stabilization method 400 is implemented by retrofitting or integrating reactors (e.g. first and second reactors corresponding to the contact and stabilization tanks respectively) with a WWTP. The modified contact and stabilization method 400 includes a modified contact stage 402 and a modified stabilization stage 404. The modified contact stage 402 corresponds to steps 202 to 216 of method 200. The modified stabilization stage 404 corresponds to steps 304 to 308 of the method 300.

Figure 5:
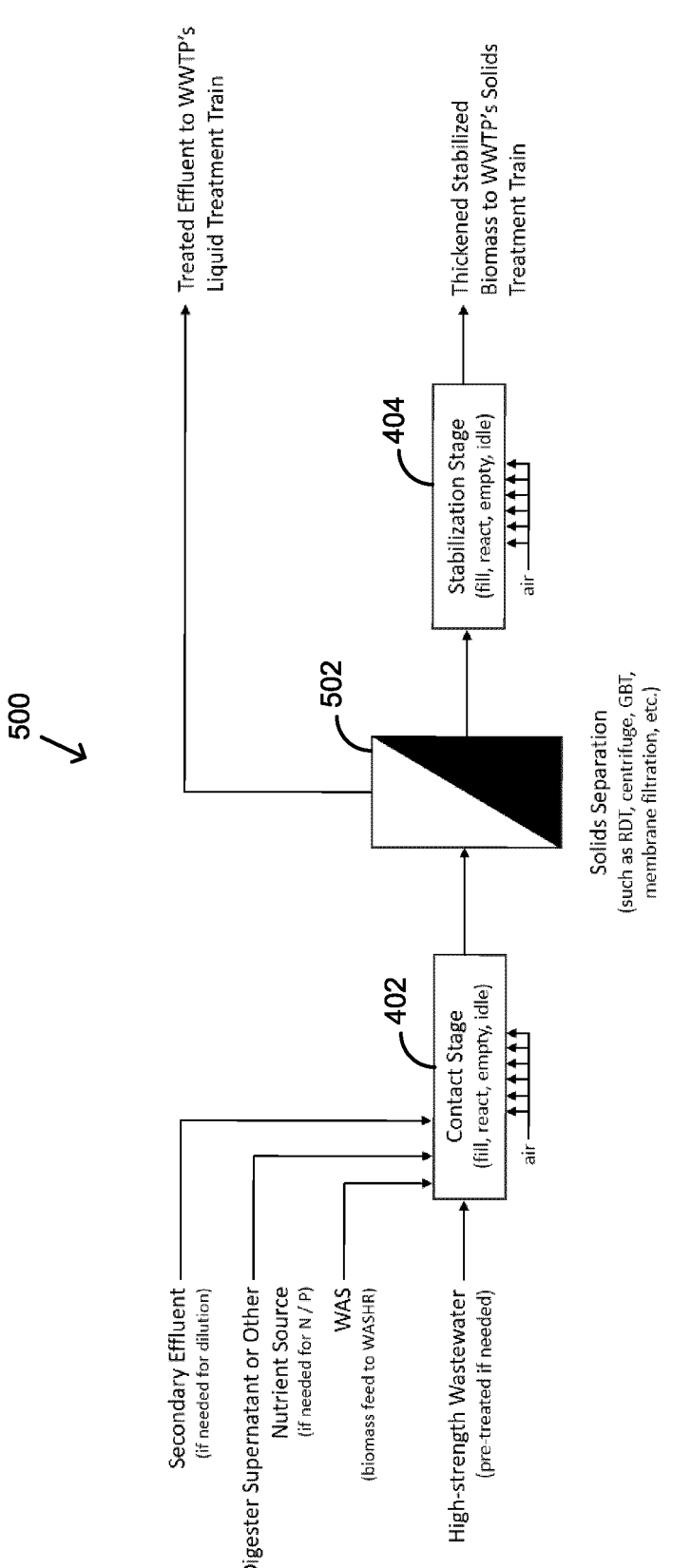
FIG. 5 is a process flow diagram showing another example embodiment of a method for pre-treating wastewater that negatively affects sludge settleability.

Referring now to FIG. 5, shown therein is a process flow diagram of another example embodiment of a method 500 for pre-treating wastewater that negatively affect sludge settleability. Method 500 is also an example embodiment of a modified contact and stabilization method that is generally employed by the methods 200 and 300 shown in FIGS. 2 and 3 in accordance with the teachings herein. The modified contact and stabilization method 500 is implemented by retrofitting or integrating reactors (e.g., first and second reactors corresponding to the contact and stabilization tanks respectively) with a WWTP. The modified contact and stabilization method 500 includes a modified contact stage 402, a solids separation stage 502 and a modified stabilization stage 404. The modified contact stage 402 corresponds to steps 202 to 216 of method 200. The solids separation stage 502 corresponds to step 213 of method 200. The treated effluent from the solids separation stage 502 may be provided to the WWTP liquid treatment train while the rest of the output from the solids separation stage 502 is provided to the stabilization stage 404. The modified stabilization stage 404 corresponds to steps 304 to 308 of the method 300.

Figure 6:
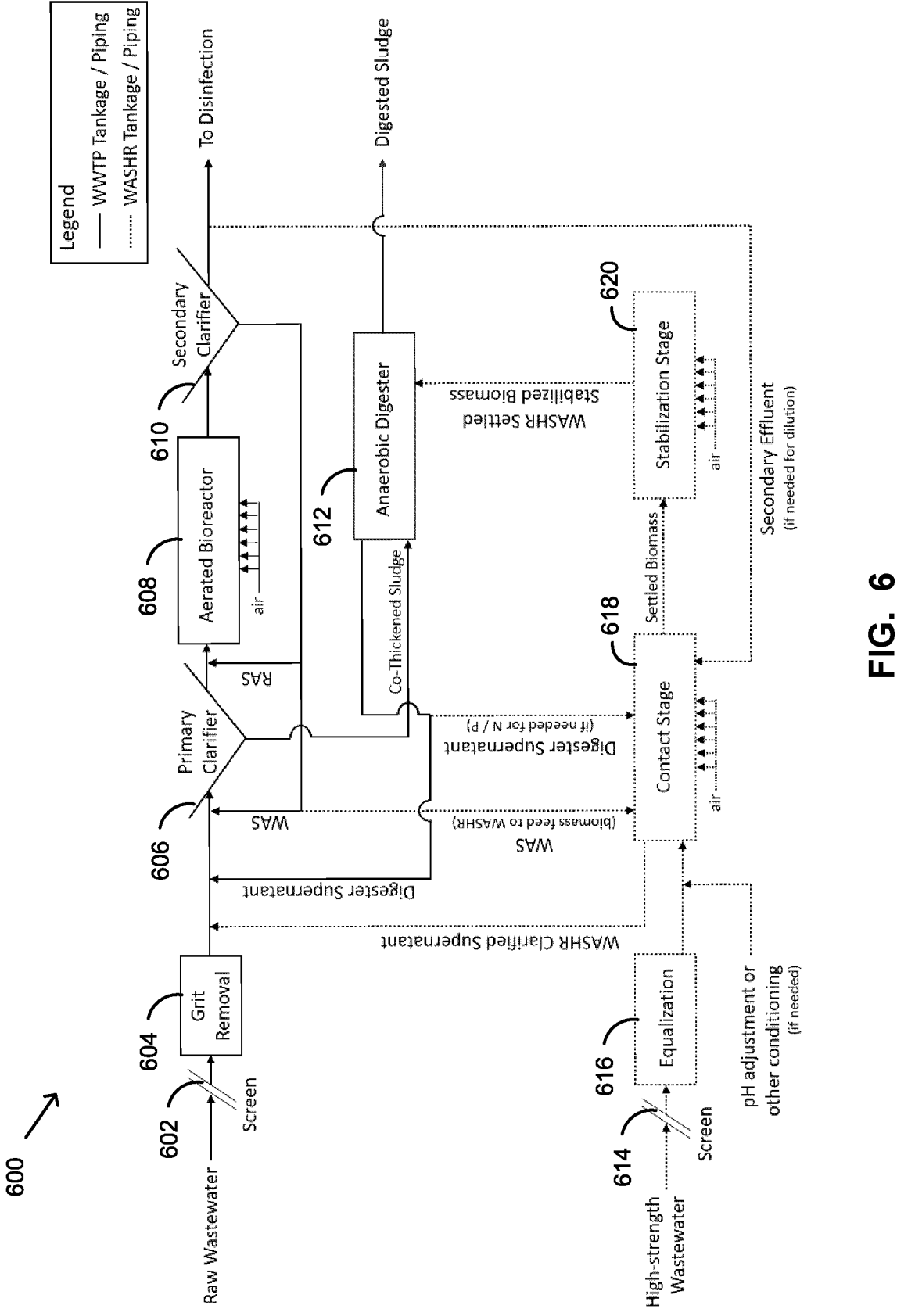
FIG. 6 is a process flow diagram showing an example embodiment of an integration of pretreatment components into a municipal WWTP treatment process to perform the method shown in FIGS. 2 to 3.

Referring now to FIG. 6, shown therein is a process flow diagram showing an example embodiment of an integration of pre-treatment components into a municipal WWTP treatment process to perform the method shown in FIGS. 2 to 3. The municipal WWTP includes a screen 602, a grit removal apparatus 604, a primary clarifier 606, an aerated bioreactor

608, a secondary clarifier 610 and an anaerobic digester 612. The pretreatment components include a screen 614, an equalization stage 616, a contact stage 618 and a stabilization stage 620. The contact and stabilization stages 616 and 618 correspond to the contact and stabilization stages 402 and 404. In an alternative embodiment, a solids separation stage 502 may also be included in between the contact stage 618 and the stabilization stage 620. The solid lines in FIG. 6 represent components and processes that are typically performed by the municipal WWTP. The dashed lines in FIG. 6 represent the pre-treatment components and processes that are used to pre-treat high strength wastewater in accordance with the teachings herein. Pumps, valves and pipes (not shown) are used to couple the various components together.

During use, raw wastewater is received and passed through the screen 602 and the grit removal apparatus 604 to produce filtered wastewater. The filtered wastewater is then provided to the primary clarifier 606 along with digester supernatant. The output of the primary clarifier 606 along with Return Activated Sludge (RAS) is provided the aerated bioreactor 608. The output of the aerated bioreactor 608 is provided to the secondary clarifier 610. The WAS sludge from the secondary clarifier 610 is provided to the primary clarifier while the rest of the output of the secondary clarifier 610 is provided to a disinfection stage of the municipal WWTP. Co-thickened sludge that is produced by the primary clarifier 606 is provided to the anaerobic digester 612. The anaerobic digester 612 produces digester supernatant that is provided to the primary clarifier 606. The anaerobic digester 612 also produces digested sludge.

Also during use, intermittently, when high strength wastewater is received, the high strength wastewater is provided to the screen 614. The screen 614 filters the high strength wastewater to produce filtered high strength wastewater which is then provided to the equalization stage 616. The equalization stage 616 may provide for temporary storage, and may involve pre-processing the filtered high strength wastewater which may include performing pH adjustment, defoaming and/or alkalinity addition or other chemical conditioning if needed (as described previously for method 200). For example, dosing chemicals can be done directly into the EQ tank). It should be noted that in at least one embodiment screening and/or equalization may not need to be performed, however, when they are performed they may enhance the performance and/or capacity of the WASHR process (e.g. stages 618 and 620).

The pre-processed high strength wastewater from the equalization stage 616, digestant supernatant or other nutrient sources (if needed) from the anaerobic digester 612, and secondary effluent (if needed) from the secondary clarifier 610 is then provided to the contact stage 618 (e.g., contact tank) so that the method 200 can be performed. In at least one embodiment, tertiary effluent or final effluent may be used instead of secondary effluent where the tertiary effluent may be obtained from a WWTP's tertiary treatment system and the final effluent may be obtained from the WWTP. As discussed previously, other nutrient sources can be added if needed during stage 618. The settled biomass produced by the contact stage 618 is provided to the stabilization stage 620 (e.g., stabilization tank). Any clarified supernatant that is produced by the contact stage 618 is provided to the primary clarifier 606. The stabilization stage 620 then performs the method 300 and produces stabilized biomass. The stabilized biomass is provided to the anaerobic digester 612.

In at least one alternative embodiment, any of the system's multiple reactors 102 can be used in the contact stage

618, multiple reactors 104 can be used in the stabilization stage 620 or multiple reactors 102 and 104 can be used in the contact and stabilization stages respectively. These multiple reactors 102 or multiple reactors 104 may be operated in parallel.

In at least one alternative embodiment, that does not use a thickening step as was shown in FIG. 4, it is possible to use a reactor (e.g., tank) that acts as both the first reactor 102 and the second reactor 104. For example, after step 214 there is just settled biomass left in the tank. Instead of sending the settle biomass to another tank, the partially filled tank that was used as first reactor 102 can now be aerated which would accomplish the same goal that is achieved using the second reactor 104.

In at least one embodiment, the WWTP 600 shown in FIG. 6 may be implemented without primary clarifiers. In such embodiments, clarified supernatant from the contact stage 618 may be provided to the bioreactor 608.

In at least one embodiment, clarified supernatant may be sent from the contact stage 618 directly to the aerated bioreactor 608 (downstream of primary clarifiers 606), or upstream of the screening/grit removal stage 602 and 604. The clarified supernatant from the contact stage 618 may be added to any element that is upstream of the aerobic bioreactor 608.

In at least one embodiment, the WWTP may be implemented without anaerobic digestion. In such embodiments, the stabilized biomass from the stabilization stage 620 can be sent to an aerobic digester, a lime stabilization system, or any other sludge treatment system, stabilization system, or storage system that is in place at the WWTP.

In at least one embodiment, the process 600 may be implemented without the stabilization stage 620. In such embodiments, the settled biomass from the contact stage 618 may be sent directly to the WWTP's solids treatment train.

In at least one embodiment, the contact and stabilization stages 618 and 620 may be implemented with WWTPs that produce waste activated sludge such as membrane bioreactor systems (such WWTPs do not have secondary clarifiers) or integrated fixed film systems (which use bioreactors that have a mix of suspended and fixed growth biomass).

Bench Scale Trial Results

Winery wastewater (WWW) is a complex high strength wastewater that was used as a high strength wastewater stream to assess the effectiveness of the WASHR process at the bench-scale using the system components and process flow of FIG. 6. While a significant fraction of the COD may be resistant to aerobic treatment, full-scale anaerobic treatment readily removes a significant fraction (89%) of the initial COD, making this wastewater highly biodegradable. Furthermore, earlier bench-scale trials confirmed that sorption is an effective contaminant removal mechanism during the aerobic biological oxidation of WWW by activated sludge from municipal wastewater treatment plants, and pH inhibition effects may be eliminated by adjusting the WWW pH prior to addition to the aerobic biomass. Table 1 presents the characteristics of the WWW and anaerobic digester supernatant used in the bench-scale trials.

Bench-scale trials were conducted using 20 L flat bottomed, open topped containers with a diameter of 29 cm each equipped with ceramic fine bubble diffusers providing a total of 4.0 L/min per container. Each of these aerobic reactors was seeded with 14 L of waste activated sludge from a municipal wastewater treatment plant, and fed with actual WWW and anaerobic digester supernatant. Four trials were run at increasing loadings of WWW (Runs A, B, C and D operating at WWW loadings of 1%, 2%, 3% and 4% v/V, respectively) using the setup shown in FIG. 6. Anaerobic digester supernatant was also added to each run (3.9% v/v) as an additional nutrient (N and P) source. Table 2 presents operating conditions for the bench-scale trials.

TABLE 1

Characteristics of the WWW and anaerobic digesters supernatant used in the bench-scale WASHR treatment trials

| Parameter | WWW | Digester Supernatant |
|---|---|---|
| COD (mg/L) | 163,000 | 1,200 |
| TOC (mg/L) | 57,300 | 259 |
| TSS (mg/L) | 71,600 | 556 |
| VSS (mg/L) | 51,600 | 438 |
| TAN (mg/L) | 10.9 | 246 |
| TP (mg/L) | 30.2 | 32.5 |

Notes:
TOC—total organic carbon
TSS—total suspended solids
VSS—volatile suspended solids
TAN—total ammonia nitrogen
TP—total phosphorus

TABLE 2

Bench-scale WASHR treatment trial operating conditions

| Parameter | Run A | Run B | Run C | Run D |
|---|---|---|---|---|
| Contact Stage | | | | |
| $MLSS_o$ (mg/L) | 1,488 | 1,488 | 1,488 | 1,488 |
| $MLVSS_o$ (mg/L) | 1,244 | 1,244 | 1,244 | 1,244 |
| Reaction Time (h) | 3 and 6 | 3 and 6 | 3 and 6 | 3 and 6 |
| Stabilization Stage | | | | |
| Reaction Time (h) | 18 | 18 | 18 | 18 |
| Initial Reactor Concentrations | | | | |
| $COD_o$ (mg/L) | 1,751 | 3,381 | 5,010 | 6,639 |
| $TOC_o$ (mg/L) | 583 | 1,156 | 1,729 | 2,302 |
| $TSS_o$ (mg/L) | 757 | 1,473 | 2,188 | 2,904 |
| $VSS_o$ (mg/L) | 551 | 1,066 | 1,582 | 2,098 |
| $TAN_o$ (mg/L) | 32.1 | 31.9 | 31.8 | 31.7 |
| $TP_o$ (mg/L) | 2.07 | 2.37 | 2.66 | 2.96 |

Figure 7A:
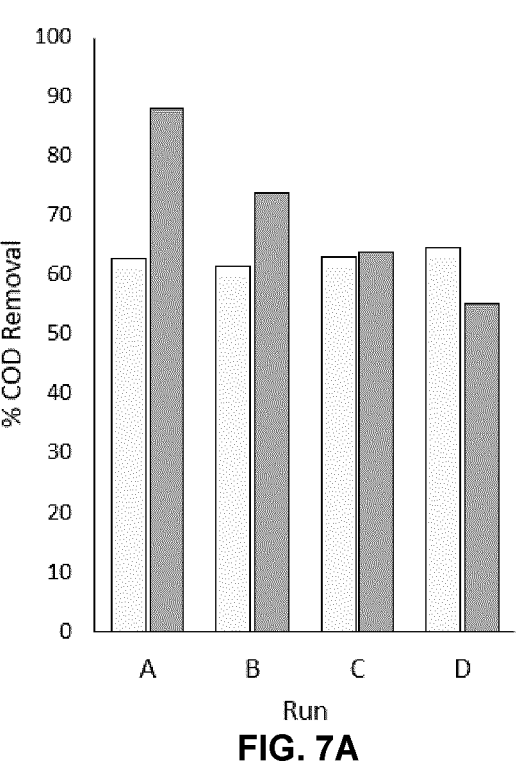
FIGS. 7A-7D show bar charts of measured removal efficiencies from bench scale trials of the example embodiment of FIG. 6.
Figure 7B:
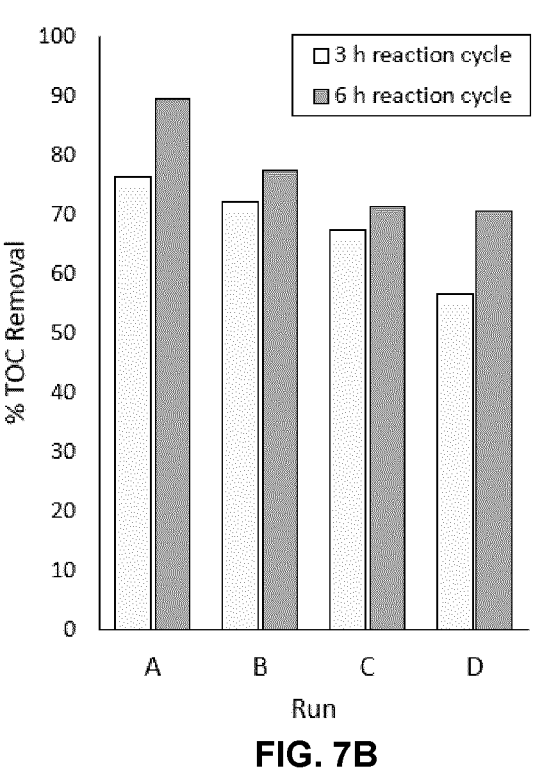
Figure 7C:
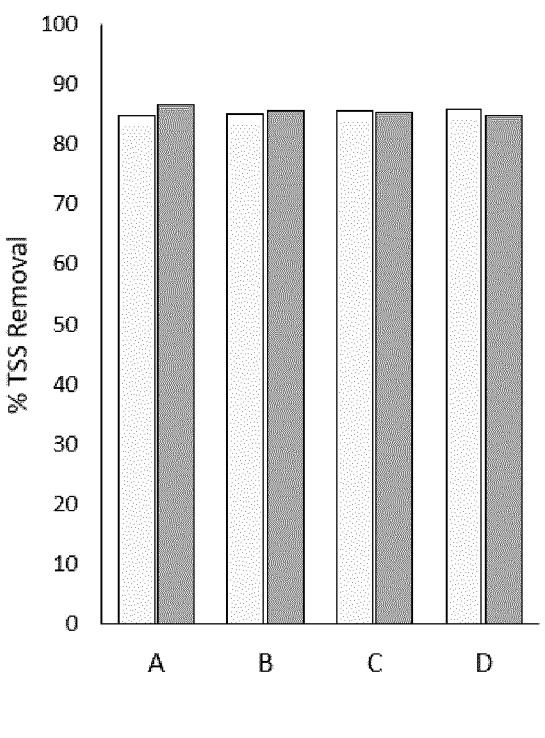
Figure 7D:
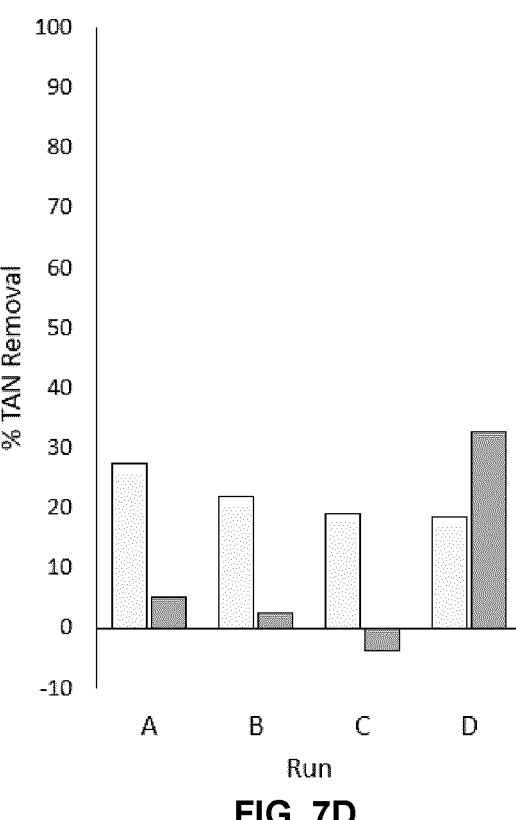

Notes:
MLSS—mixed liquor suspended solids
MLVSS—mixed liquor volatile suspended solids
Subscript $_o$ represents initial conditions Measured removal efficiencies during the contact phase of the bench-scale WASHR treatment of WWW after reaction cycle times of 3 h and 6 h are presented in FIGS. 7A-7D. After 3 h of reaction time, removal efficiencies ranges from 61.5% to 64.6% for COD (see FIG. 7A), 56.6% to 76.3% for TOC (see FIG. 7B), 84.7% to 85.7% for TSS (see FIG. 7C) and 18.5% to 27.3% for TAN (see FIG. 7D). Treatment performance was more variable after 6 h of reaction time, with improved COD and TOC removals (with the exception of Run D); however, TAN removal rates decreased significantly (with the exception of Run D). TSS removal rates did not vary with reaction times. The most consistent performance was observed with a contact phase reaction cycle time of 3 h.

During the stabilization phase, performance assessment was based on solids removal rates since this is an important design parameter for the municipal WWTP's anaerobic digesters. Over the 18 h stabilization stage, total solids (TS) removals ranged from 7.4% (Run A) to 17.3% (Run C). TSS increased during each run (9.3% to 13.1%) due to biomass growth, confirming the continued aerobic oxidation of the sorbed contaminants during the stabilization phase.

A holistic assessment approach was used to calculate the reductions in loadings to the municipal WWTP's liquid and solids treatment trains that could be achieved via the use of the WASHR pre-treatment system as compared to directing all the WWW to either treatment train (current operating strategy). Parameters of focus of each treatment train consisted of the important design parameters for each. The loading reductions estimated using the results of the bench-scale trials are presented in Table 3. These results are based on reaction times of 3 h (contact phase) and 21 h (stabilization stage).

TABLE 3

Projected reductions in loadings to the WWTP's treatment trains achievable using the WASHR pre-treatment system compared with direct co-treatment of WWW

| Parameter | Reduction in Loadings to: | |
| | Liquid Treatment Train | Solids Treatment Train |
| --- | --- | --- |
| COD | 81.4% | 59.6% |
| TOC | 83.6% | — |
| TSS | 92.8% | 30.2% |
| VS | — | 47.9% |
| TAN | 59.3% | — |

Based on the results of the bench-scale trials, the WASHR process of the teachings herein can significantly reduce loadings on downstream municipal wastewater treatment plant's treatment processes. Operating costs are greatly reduced because the WASHR process uses two waste streams (WAS and digester supernatant) to provide biomass and nutrients to the pre-treatment system. In addition, the substantial reductions in loadings to the municipal wastewater treatment plant's liquid and solids treatment trains can reduce and/or eliminate upgrades needed to effectively treat high strength waste streams, particularly those that are periodic in nature.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

The invention claimed is:

1. A method of pre-treating high strength wastewater, wherein the method comprises:
   providing high strength wastewater to a first reactor;
   providing waste activated sludge from a wastewater treatment plant to the first reactor;
   forming a mixed liquor from the high strength wastewater and the waste activated sludge;
   aerating the mixed liquor;
   separating the mixed liquor to form a clarified supernatant and a biomass;
   providing the clarified supernatant to a liquid treatment train of the wastewater treatment plant; and
   after separating the mixed liquor into the clarified supernatant and the biomass, providing the biomass to a second reactor:
   aerating the contents of the second reactor; and providing the contents of the second reactor to a solid treatment train of the wastewater treatment plant.

2. The method of claim 1, wherein the method further comprises performing a mechanical sludge thickening process on the biomass before providing the biomass to the second reactor.

3. The method of claim 2, wherein the mechanical sludge thickening process is performed using a rotary drum thickener, a thickening centrifuge, gravity belt thickener or rotary presses.

4. The method of claim 1, wherein the method is operated in batch mode and the first reactor is emptied after the biomass is provided to the second reactor and the clarified supernatant is provided to the liquid treatment train of the wastewater treatment plant.

5. The method of claim 1, wherein the second reactor is emptied after the contents of the second reactor are provided to the solid treatment train of the wastewater treatment plant.

6. The method of claim 1, further comprising providing digester supernatant to the first reactor before aerating the mixed liquor.

7. The method of claim 1, further comprising providing secondary effluent, tertiary effluent, final effluent, potable water and/or freshwater to the first reactor before aerating the mixed liquor.

8. The method of claim 1, wherein the first reactor is a membrane bioreactor, a contact tank or has an integrated aeration system.

9. The method of claim 1, further comprising pre-treating the high strength wastewater including performing filtering and/or chemical pretreatment before providing the high strength wastewater to the first reactor.

10. The method of claim 1, wherein the high strength wastewater is obtained from one or more of a food processing operation, a beverage processing operation, a wine producing operation, an agricultural operation, septage, or a wastewater source which provides the high strength wastewater with a biochemical oxygen demand of at least about 1000 mg/L.

11. A system for use with a wastewater treatment plant for pre-treating high strength wastewater, wherein the system comprises:
   a first reactor that is operationally couplable to the wastewater treatment plant and is configured to receive the high strength wastewater from a high strength wastewater source, receive waste activated sludge from the wastewater treatment plant, form a mixed liquor from the high strength wastewater source and the waste activated sludge, aerate the mixed liquor, separating the mixed liquor to form a clarified supernatant and a biomass, and provide the clarified supernatant to a liquid treatment train of the wastewater treatment plant;
   a second reactor that is coupled to the first reactor, the second reactor being configured to receive the biomass from the first reactor, aerate the biomass, and provide the aerated biomass to a solid treatment train of the wastewater treatment plant;
   one or more sensors;
   integrated aeration equipment or external aeration equipment for performing aeration in first and second reactors; and
   a control system that is coupled to the first and second reactors and configured to control one or more aspects of a treatment process performed by the first and second reactors including the aeration in the first and second reactors based on data measured by the one or more sensors.

12. The system of claim 11, wherein after the aerated biomass is separated into the clarified supernatant and the biomass, the second reactor is further configured to provide contents within the second reactor to the solid treatment train of the wastewater treatment plant.

13. The system of claim 11, wherein the system further comprises a mechanical sludge thickening apparatus that is coupled to the first reactor and the second reactor, and the mechanical sludge thickening apparatus is configured to receive the biomass from the first reactor, perform a thickening process to form a thickened biomass, and provide the thickened biomass to the second reactor.

14. The system of claim 13, wherein the mechanical sludge thickening apparatus is a rotary drum thickener, a thickening centrifuge, a gravity belt thickener or rotary presses.

15. The system of claim 11, wherein the first reactor is configured to be empty: (a) after the biomass is provided to the second reactor and the clarified supernatant is provided to the liquid treatment train of the wastewater treatment plant and/or (b) after the contents of the second reactor are provided to the solid treatment train of the wastewater treatment plant.

16. The system of claim 11, wherein the first reactor is further configured to receive a digester supernatant from the wastewater treatment plant, before aerating the mixed liquor.

17. The system of claim 11, wherein the first reactor is further configured to receive a secondary effluent, a tertiary effluent, a final effluent, potable water and/or freshwater before aerating the mixed liquor, where the secondary effluent, the tertiary effluent, or the final effluent are received from the wastewater treatment plant.

18. The system of claim 11, wherein the high strength wastewater has a biochemical oxygen demand of at least about 1000 mg/L.

19. The system of claim 11, wherein the first reactor is a membrane bioreactor, a contact tank or has an integrated aeration system.

* * * * *